(No Model.)

W. BONNAR.
WHEEL FOR VEHICLES.

No. 516,072. Patented Mar. 6, 1894.

Witnesses

Inventor
Wm. Bonnar
by Donald C. Ridout & Co.
Atty.

UNITED STATES PATENT OFFICE.

WILLIAM BONNAR, OF BOLTON, CANADA.

WHEEL FOR VEHICLES.

SPECIFICATION forming part of Letters Patent No. 516,072, dated March 6, 1894.

Application filed July 15, 1893. Serial No. 480,571. (No model.)

*To all whom it may concern:*

Be it known that I, WILLIAM BONNAR, of the village of Bolton, in the county of Peel, in the Province of Ontario, Canada, have invented a certain new and useful Improvement in Wheels for Vehicles, of which the following is a specification.

The object of my invention is to produce a light, strong and easily constructed wheel for buggies and other vehicles, and it consists essentially, in securing the inner ends of the spokes between two disks held on a spindle journaled in a bearing formed on the end of the axle of the vehicle, substantially as hereinafter more particularly explained and then definitely claimed.

Figure 1:
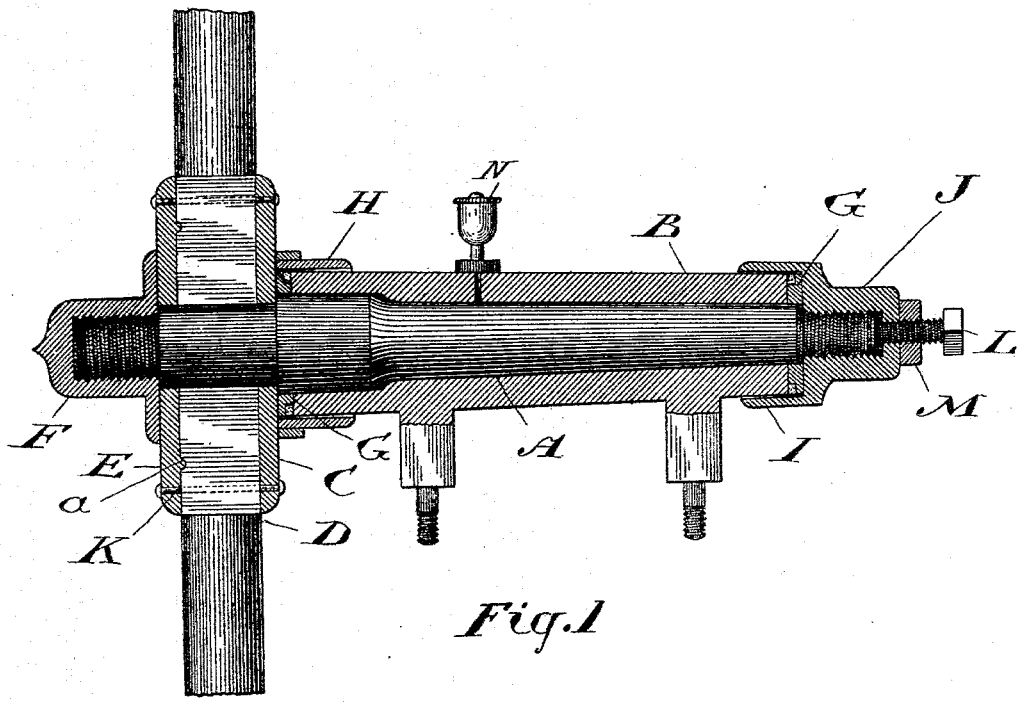
Figure 2:
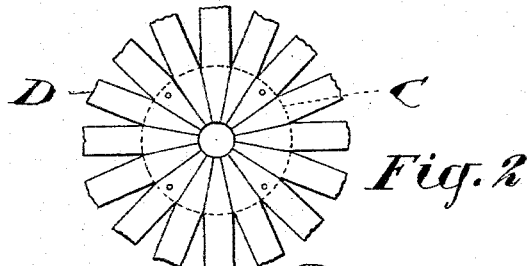
Figure 3:
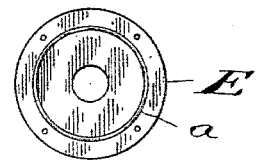
Figure 4:
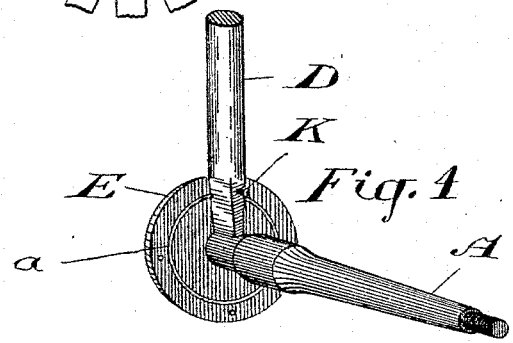
Figure 5:

In the accompanying drawings, Figure 1 is a sectional end view of a buggy axle provided with my improved wheel. Fig. 2, is a side elevation of the center of a wheel showing the arrangement of the spokes. Fig. 3, is an inside view of one of the disks between which the spokes are clamped. Fig. 4, is a perspective detail showing one disk and one spoke in position on the spindle. Fig. 5, is a sectional perspective detail of one of the dust collecting washers used with the wheel.

In the drawings—A, is a spindle journaled in a bearing box B, secured to the end of the axle.

C, is a disk shrunk upon or otherwise rigidly fastened to the spindle A. The spokes D, are shaped to fit around the spindle A, against the face of the disk C. A disk E, is then slipped on the spindle on the other side of the spokes D. Either one or both of the disks C, and E, are provided with a bead *a*, so that when the nut F, on the spindle is screwed up, the bead *a*, is forced into the spokes D, so as to securely grip and lock them together. To further secure the disks together, rivets K, may be used (see Fig. 1).

A wheel made as described, will be both light and strong and can be very readily repaired should a spoke be accidentally broken. As the spindle revolves in the bearing instead of the bearing revolving on the spindle, the weight in my arrangement is carried on the upper side of the bearing instead of on the lower side as is the case when the wheel revolves on its spindle or axle. It, therefore, follows that I have more leverage in proportion to the size of the wheel than is secured when the weight is carried on the bottom of the bearing. The spindle A, is held in position by the nut J. A set-screw L, extends through the end of the nut J, and bears against the end of the spindle A, and serves as a stop to regulate the position of the nut J, on the spindle so that the spindle may be adjusted in the bearing as may be found necessary. A jam nut M, is provided on the set-screw so that it may be securely held when adjusted. A washer G, of peculiar construction is placed on the spindle between the disk C, and the bearing box and between the nut J, and the bearing box. The edge of the rim of this washer is recessed and the recess filled with stearine or any other suitable substance which will collect any fine sand which may find its way under the sand flange H, connected to the disk C, or the sand flange I, connected to the nut J.

To facilitate the oiling of the bearing, I place an oil cup N, on the bearing box B, as shown which feeds the bearing with a constant supply of lubricating material.

What I claim as my invention is—

1. In a vehicle, a wheel having a spindle rigidly secured thereto, and a cap secured to the end of the spindle, in combination with a bearing box around said spindle between said wheel and cap, substantially as described.

2. In a vehicle, a spindle having a collar fast thereon, spokes fitting around said spindle alongside of said collar, a second collar on said spindle, a nut F on the end of said spindle for securing the collars, thereby holding the spokes between said collars, and a cap secured to the end of said spindle in combination with a bearing-box around said spindle between said wheel and cap, substantially as described.

3. In a vehicle, a wheel having a spindle rigidly secured thereto, a bearing box for said spindle, a cap at the end of said bearing and secured to said spindle, and a set screw passing through said cap and acting on the spindle, substantially as described.

4. In a vehicle, a wheel having a spindle rigidly secured thereto, a bearing box for said spindle, a cap at the end of said bearing and secured to said spindle, sand flanges secured to said wheel and cap and projecting over said bearing box, substantially as described.

5. In a vehicle, a wheel, a bearing therefor, and a groove around said bearing adapted to be filled with stearine or similar material, whereby said groove acts as a trap to collect sand, substantially as described.

6. In a vehicle, a wheel having a sand flange projecting therefrom, a bearing for said wheel, and a groove around said bearing under said sand flange, and adapted to be filled with stearine or similar material, whereby said groove acts as a trap for sand, substantially as described.

Chicago Heights, June 17, 1893.

WILLIAM BONNAR.

In presence of—
 A. JACOBS,
 T. E. MILLS.